United States Patent [19]
Wada et al.

[11] Patent Number: 5,061,544
[45] Date of Patent: Oct. 29, 1991

[54] POROUS ALUMINUM OXIDE FILM AND METHOD OF FORMING OF THE SAME

[75] Inventors: Kazuhiro Wada, Kyoto; Nobuyoshi Baba, Kawasaki; Sachiko Ono; Takako Yoshino, both of Tokyo, all of Japan

[73] Assignee: Kyoto University, Kyoto, Japan

[21] Appl. No.: 412,732

[22] Filed: Sep. 26, 1989

[30] Foreign Application Priority Data
Mar. 31, 1989 [JP] Japan .................................. 1-82141

[51] Int. Cl.$^5$ .............................................. B32B 3/10
[52] U.S. Cl. .................................... 428/131; 428/134
[58] Field of Search ................................ 428/131, 134

[56] References Cited

U.S. PATENT DOCUMENTS 3,671,410 6/1972 Stahr ............................... 204/58
3,850,762 11/1974 Smith ............................... 204/11

FOREIGN PATENT DOCUMENTS 178831 4/1986 European Pat. Off. .
2444541 6/1975 Fed. Rep. of Germany .

Primary Examiner—T. M. Tufariello
Attorney, Agent, or Firm—Schwartz & Weinrieb

[57] ABSTRACT

A porous aluminum oxide film has a plurality of pores extending through the film. Each pore has a pair of smaller diameter pores and a larger diameter pore. The larger diameter pore is disposed within a central portion of the film with respect to the thickness of the film, and the smaller diameter pores are disposed upon both ends of the larger diameter pore.

14 Claims, 9 Drawing Sheets

FIG. I

FIG. 3
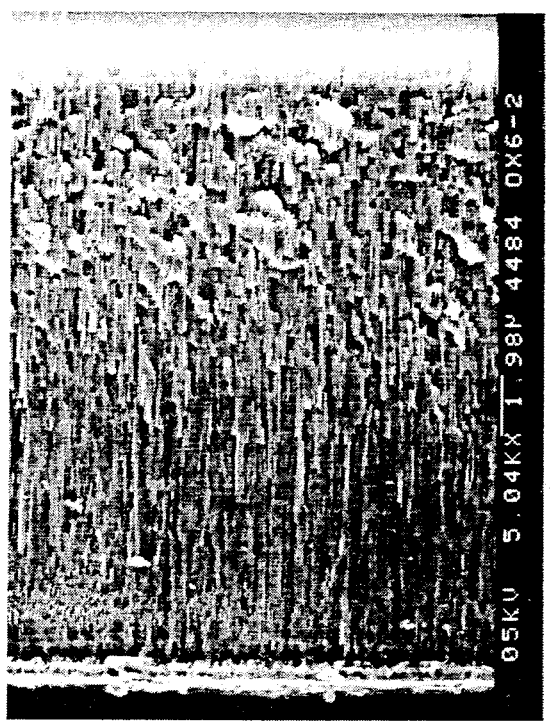
ELECTROLYTE
SUBSTRATE (ALUMINUM)
FIG. 4
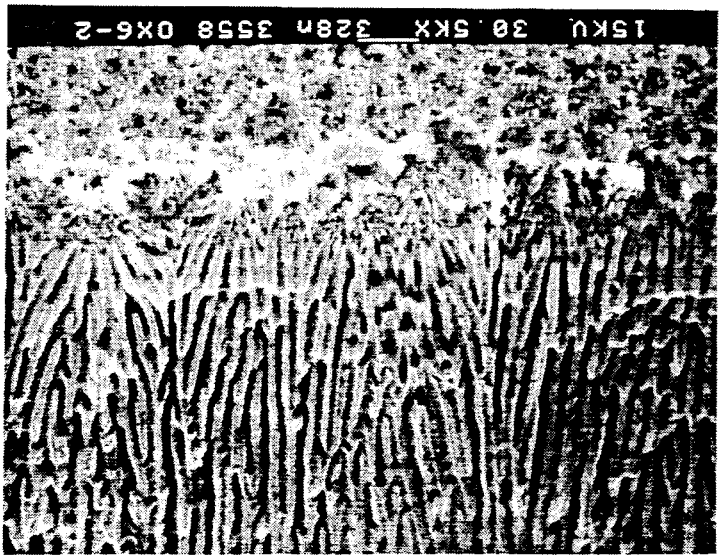
ELECTROLYTE
SUBSTRATE (ALUMINUM)

ELECTROLYTE
↑

↓
SUBSTRATE (ALUMINUM)

ELECTROLYTE
↑

↓
SUBSTRATE(ALUMINUM)

5,061,544

POROUS ALUMINUM OXIDE FILM AND METHOD OF FORMING OF THE SAME

FIELD OF THE INVENTION

The present invention relates to a porous aluminum oxide film having fine pores defined therein, each pore passing through the film, and more particularly to a porous aluminum oxide film which is available for use as a separation membrane.

BACKGROUND OF THE INVENTION

Heretofore, a porous filter or membrane fabriated from an organic material and having a plurality of pores defined therein, each pore having a very small diameter, such as, for example, 0.05 μm, has been manufactured. Such a film has advantages, such as, for example, softness and toughness. However, the film has disadvantages in that it cannot be employed within a device disposed within a high-temperature fluid due to the fact that the diameter of each pore is liable to change, each pore may become clogged with foreign material, and furthermore, a larger pressure difference is required for passing a fluid through the film. Still further, the resistivity against the effects of chemical agents, particularly organic solvents, is low.

An inorganic porous separation membrane such as, for example, a porous anodic aluminum oxide film has been developed so as to eliminate the above-mentioned disadvantages.

In a typical anodic aluminum oxide film, each pore comprises a larger diameter portion upon an electrolyte side and a smaller diameter portion having a plurality of fine branches adjacent an aluminum metal substrate. The smaller pore is formed by reducing the applied voltage during the final step of anodic oxidation of the the aluminum metal substrate (European Patent Application 178831 A1).

The porous anodic aluminum oxide film exhibits the advantages of durability, higher separation efficiency due to its large porosity, and the pores are able to be prevented from clogging because of the uniformity of the pore diameter. The film, however, has disadvantages in that the aluminum oxide reacts with water because of its high activity so as to produce hydrates within the pores, which are accumulated within the pores, resulting in an effective reduction of the pore diameter. Consequently, the film can not be used for a long period of time for separating a fluid containing water or moisture.

It is known that the reduction of the pore diameter because of aforenoted hydration can be prevented by denaturing the noncrystalline aluminum oxide, produced by means of the electrolysis of the aluminum substrate, into a crystalline aluminum oxide such as, for example, alumina, by means of heat treatment at high temperature levels (furnace temperatures of approximately 1100° C.).

It is reported that an experiment in which variations of electrical properties were investigated in order to obtain data on the hygroscopic degree of the porous aluminum oxide film was conducted on the basis that the electrical properties are dependent upon the hygroscopic degree, and which the electrical property that is the admittance of the film without heat treatment was reduced to approximately one-fifth of its initial degree within approximately 4 months which means that the hygroscopicity of such a film is high, and that, to the contrary, the admittance of the film heat-treated at 1100° C. did not change for one year, which means that the hygroscopicity of this type of film is very low.

Thus, it is understood from the facts described above that heat treatment is effective for preventing the pore diameter within the aluminum oxide film from changing as a function of time.

As described above, the porosity of the porous aluminum oxide film is different upon the opposite sides thereof. Accordingly, when the high temperature heat treatment of the film is performed in order to remove the hygroscopic property thereof, the film is curved because of the difference between the porosities of the opposite sides thereof. In an extreme case, the radius of its curvature may equal several millimeters. As a result, the area of the flat part of the film is substantially reduced, so that the film can not be used in practice.

OBJECTS OF THE INVENTION

It is an object of the present invention to provide a porous aluminum oxide film which does not deform upon heat treatment thereof so that the film may be used within many different industrial fields.

Another object of the present invention is to provide a method of preparing the porous aluminum oxide film.

SUMMARY OF THE INVENTION

It is known that the pore diameter of the porous anodic aluminum oxide film is changed by changing the electrolysis voltage, and it is known also that if the voltage is changed substantially, such as, for example one-half of the normal or previous voltage level, several fine branches of pores are formed. For example, if the voltage is reduced from 10 V to 5 V, pores each of which has a diameter of several nanometers, are formed. Therefore, the diameter of the pore and each disposition of the small diameter portions can be controlled by changing the applied voltage.

The present invention utilizes such a relationship between the diameter of the pores and the electrolysis voltage.

According to the present invention, there is provided a porous aluminum oxide film having a plurality of pores passing through the film, characterized in that, each pore has a pair of smaller diameter pores and a larger diameter pore, the larger diameter pore being disposed within a central portion of the film with respect to the thickness of the film, and the smaller diameter pores extend from both faces of the film to the larger diameter pore so as to communicate with the larger diameter pore.

In an accordance with one aspect of each invention, the smaller diameter pore includes a plurality of branches.

A method of forming a porous aluminum oxide film is also disclosured.

The method comprises anodizing an aluminum substrate so as to form an aluminum oxide film, changing the voltage applied to the aluminum substrate during the anodizing step so as to form a plurality of pores passing through the film so that each pore comprises a larger diameter pore within the film at a central portion thereof with respect to the thickness of the film, and a pair of smaller diameter pores at both ends of the larger diameter pore, and separating the aluminum oxide film from the aluminum substrate. The voltage is increased during an intervening time period of the anodizing process so as to form the larger diameter pores.

BRIEF DESCRIPTION OF THE DRAWINGS

These and other objects and features of the present invention will become more apparent from the following detailed description with reference to the accompanying drawings, in which like reference characters designate like or corresponding parts throughout the several views, and wherein:

FIG. 3 is a scanning electron microscopic photograph of a section of the film of FIG. 2;

FIG. 4 is a scanning electron microscopic photograph of a section upon the electrolyte side of the film;

DETAILED DESCRIPTION OF THE PREFERRED EMBODIMENTS

Figure 1:
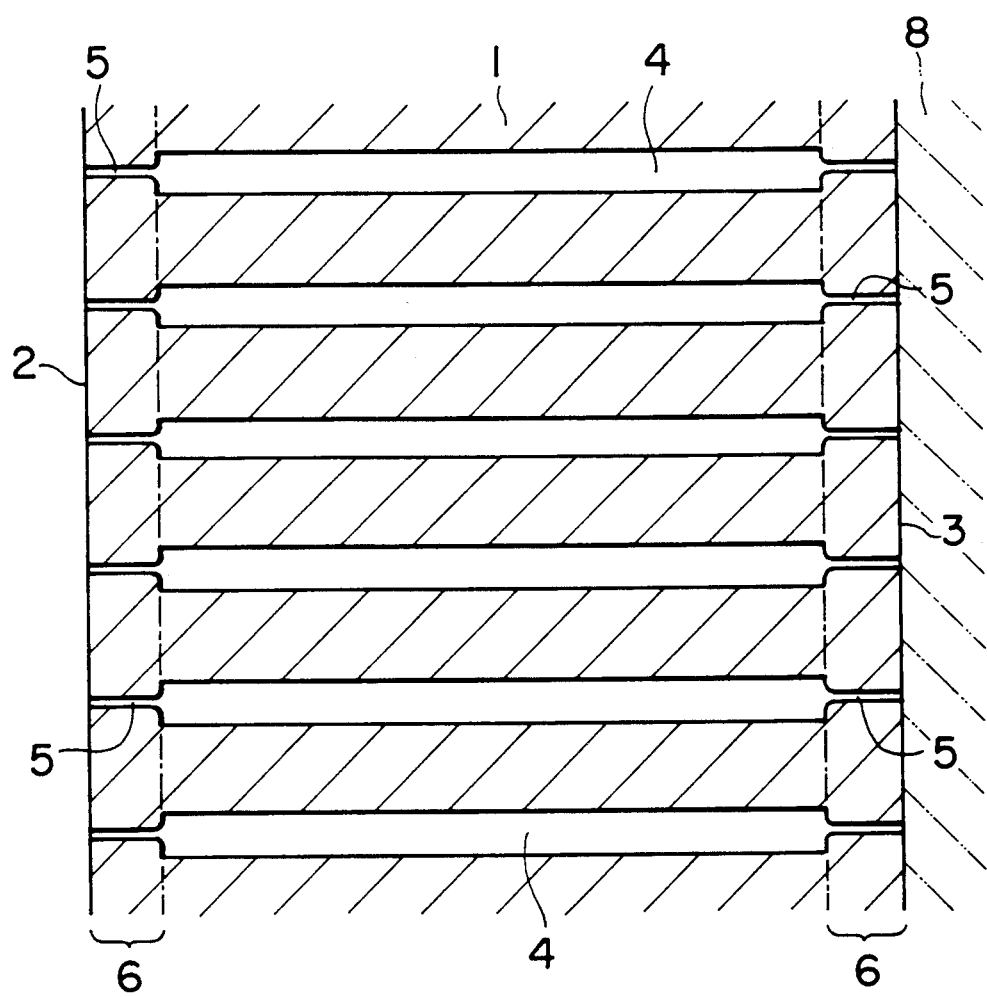
FIG. 1 is a schematic sectional view of a porous aluminum oxide film constructed according to the present invention.

Referring to FIG. 1, an aluminum oxide film 1 has a plurality of parallel pores defined therein, each of which extends from an electrolyte side face 2 to an aluminum substrate side face 3 and is open at both faces thereof. Each pore comprises a pair of smaller diameter pores 5 adjacent both the faces 2 and 3, and a larger diameter pore 4 interposed between the pores 5.

Figure 2:
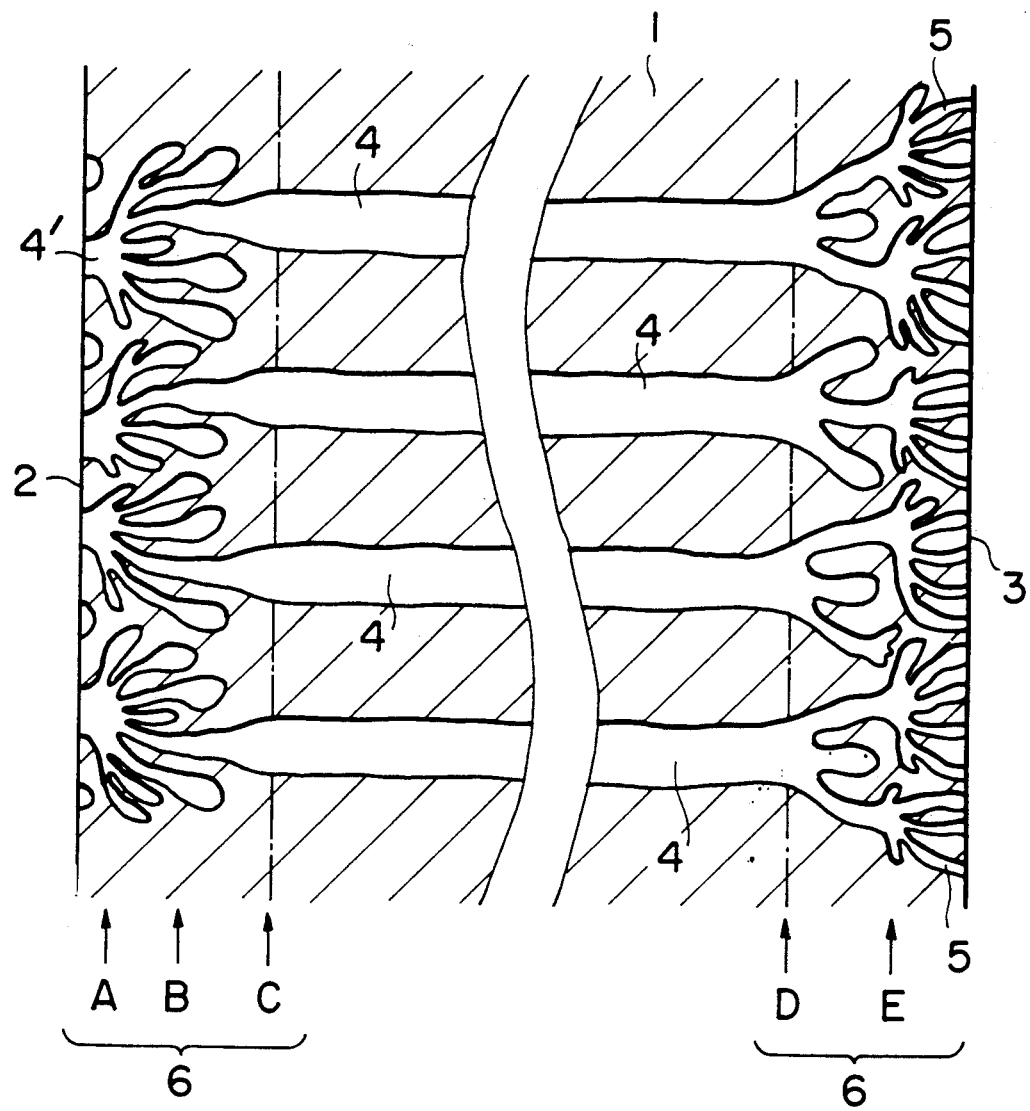
FIG. 2 is an enlarged sectional view of a film constructed according to a first embodiment of the present invention.

As shown in FIG. 2, each smaller diameter pore 5 comprises a plurality of fine branches so as to form a dense pore portion 6 (FIG. 1). At least one of the branches communicates with the pore 4.

Figure 5:
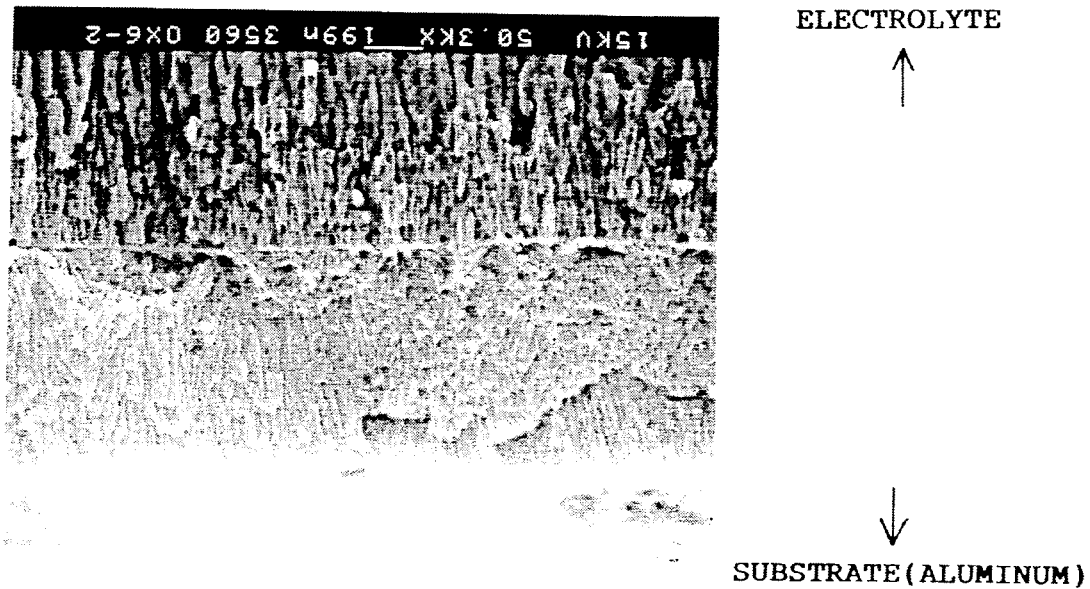
FIG. 5 is a scanning electron microscopic photograph of a section upon the aluminum substrate side of the film.

FIGS. 3 and 4 are microscopic photographs. The photograph of FIG. 3 is equivalent to a level of approximately 5000 magnifications, while the photograph of FIG. 4 is equivalent to a level of approximately 30,000 magnifications, and FIG. 5 is equivalent to a level of approximately 50,000 magnifications. Scales described in white represent 1.98 μm, 328 nm and 199 nm respectively. It will be seen that the diameter of the larger diameter pore 4 is equal to several tens of nanometers and the diameter of smaller pore 5 is equal to several nanometers.

Since the aluminum oxide film according to the present invention has pores each of which has a symmetrical shape with respect to the thickness of the film, the film does not deform upon heat treatment thereof. Since the heat-treated film has water-resistant properties the diameter of each pore does not change as a function of time. Furthermore, because of the heat-resistant property of the film, the film can be used for separating a high temperature water solution and high temperature gases which include water vapor.

Additionally, since smaller diameter pores 5 are provided upon both sides of the film, the dynamic strength of the film increased.

Figure 6:
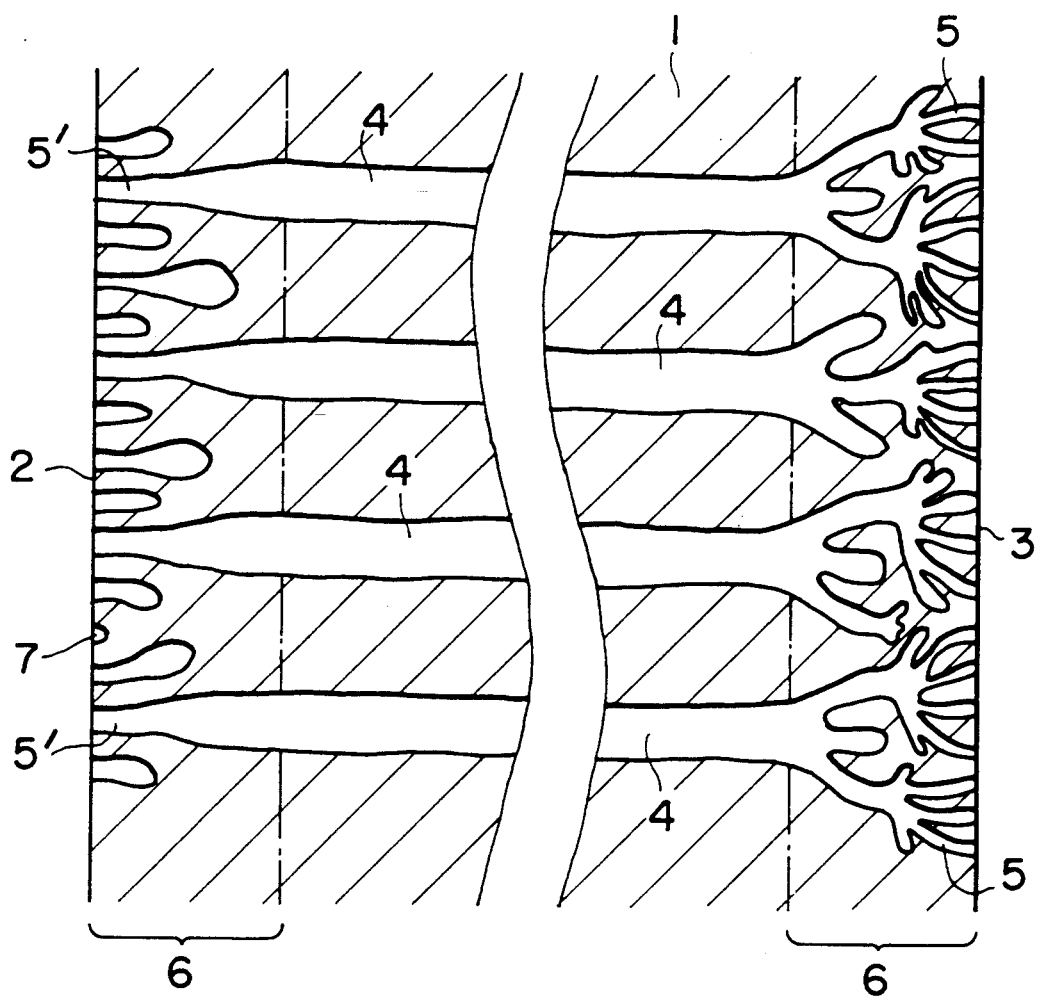
FIG. 6 is an enlarged sectional view of a film constructed according to a second embodiment of the present invention.

The second embodiment shown in FIG. 6 is hereinafter described. The film 1 is different from the first embodiment of FIG. 2 in connection with dense pore portion 6. Namely each smaller diameter pore 5' upon the electrolyte side of the film 1 does not have branches. Other parts are the same as those of the first embodiment in structure and are identified with the same reference numerals as in FIG. 2, so that a detailed description thereof is omitted.

The method for forming the porous film is hereinafter described.

As described above, the diameters of the pores and the distance between pores are substantially proportional to the electrolysis voltage. When the voltage is substantially reduced, the pores are divided into branches. Therefore, the method for forming the smaller diameter pores can be sub-divided into the following two methods:

(1) A method for progressively reducing the diameter of each pore by gradually reducing the voltage (hereinafter called the gradual reduction method), and (2) A method for forming pore branches by substantially reducing the voltage (the branching method).

The branching method produces smaller diameter pores than the gradual reduction method.

In order to increase the diameters of the pore pores, the voltage is increased. Thus, four combination methods can be provided for forming the pores of the present invention, as shown in Table 1.

TABLE 1

| | | Process of voltage change | | |
|---|---|---|---|---|
| | Combination | electrolyte side | interior | Substrate side |
| (1) | branching/branching | Substantial reduction | increase, constant voltage hold | Substantial reduction |
| (2) | branching/gradual reduction | Substantial reduction | increase, constant voltage hold | gradual reduction |
| (3) | gradual increase/ branching | increase | constant | Substantial reduction |
| (4) | gradual increase/ gradual reduction | increase | constant | gradual reduction |

The method of forming the porous aluminum oxide film of the first embodiment is hereinafter described. The method employs the combination (1) in Table 1.

Figure 9:
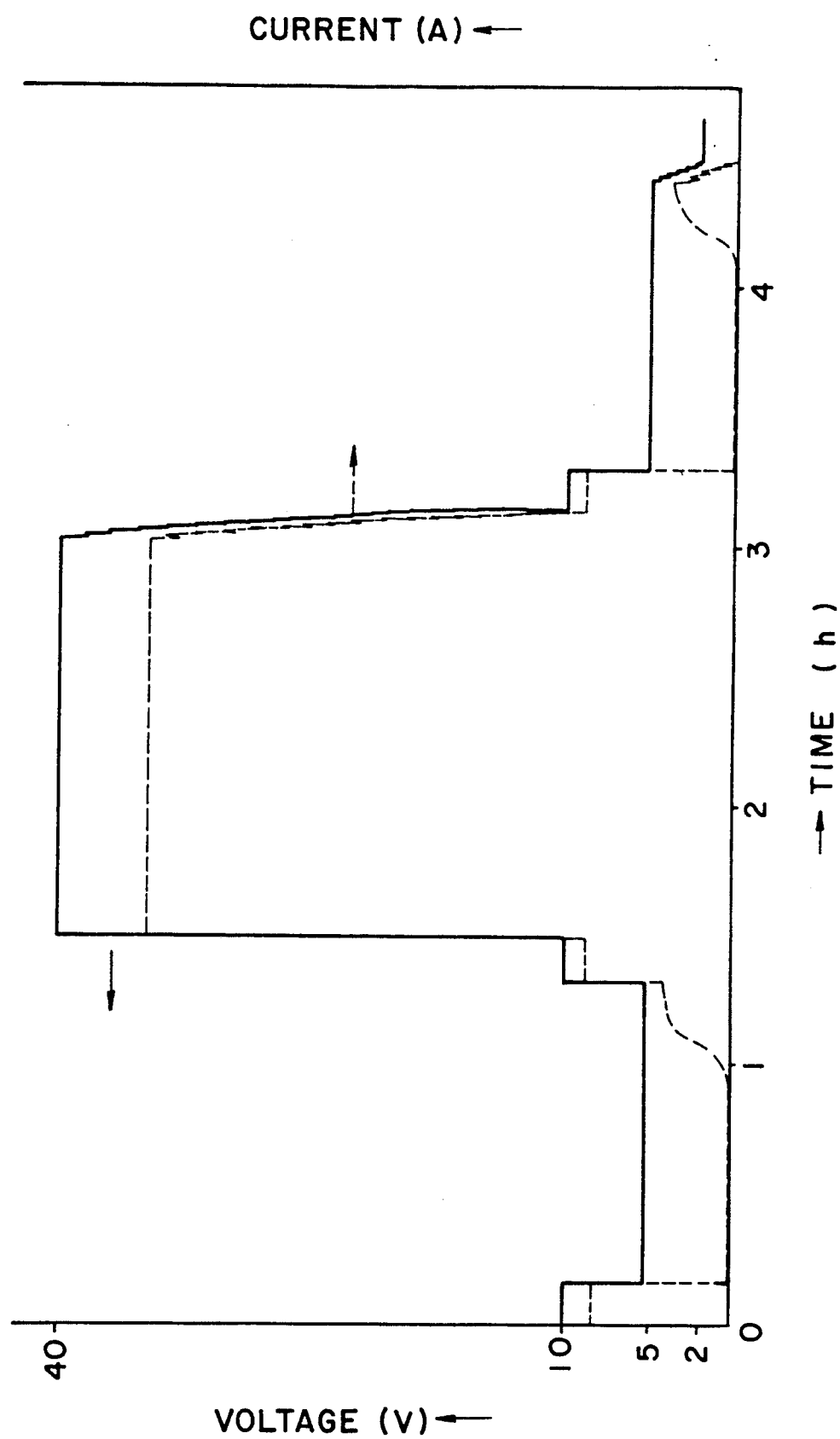
FIG. 9 is a graph showing the electrolysis voltage and current for forming the pores of the film of the first embodiment as function of time.

An aluminum metal substrate 8 (FIG. 1) is anodized within a water solution of oxalic acid so as to form the aluminum oxide film 1. As shown in FIG. 9, an initial voltage of 10 V is applied for 10 minutes, thereby forming smaller diameter pores 4' (FIG. 2). Thereafter, the voltage is substantially reduced to 5 volts which is applied for 70 minutes so as to form smaller branches A shown in FIG. 2. The voltage is then increased to 10 volts and continued for 10 minutes so as to form larger branches B. When the voltage is increased to 40 volts the diameters of the pores are increased as shown at C to form larger pores 4. At that time, at least one of the branches communicates with the pore 4. After the larger pores 4 are completed, the voltage is reduced to 10 volts and continued for 10 minutes so as to form branches D. A voltage of 5 volts for 70 minutes is then applied so as to form branches E. Finally, the voltage is reduced to 2 volts. The dotted line in FIG. 9 represents electrolysis current. The anodic oxide film is separated from the substrate 8 by proper means, such as, for example by inverting the polarity of the electrolysis voltage. Thus, smaller diameter pores are formed upon both sides of a thin film, for example to the depth of 1 $\mu$m from each surface of a film having a thickness of 24 $\mu$m.

The film of the second embodiment shown in FIG. 6 is formed by means of the combination (3) of Table 1, as follows.

Figure 10:
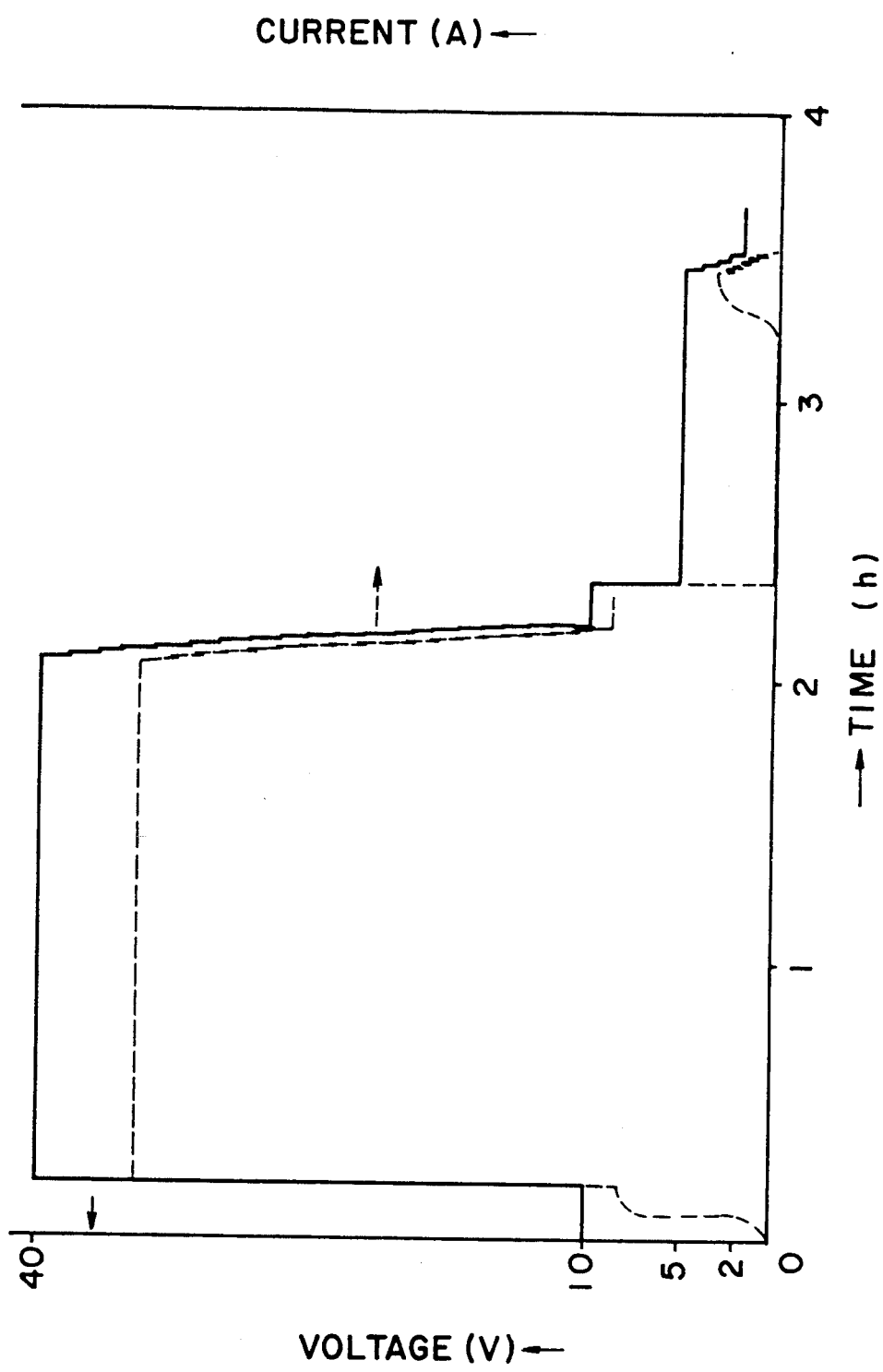
FIG. 10 is a graph showing the electrolysis voltage and current for forming the pores of the film of the second embodiment, as a function of time.

An aluminum metal substrate is anodized within a water solution of ammonium tartrate at a voltage of 10 volts for five minutes. Thereafter, the aluminum substrate is anodized within a water solution of oxalic acid as shown in FIG. 10. Namely, a voltage of 10 V for 12 minutes, 40 V for 2 hours, 10 V for 10 minutes, 5 V for 70 minutes, and subsequently 2 V is applied to an electrode and the substrate.

In accordance with the anodizing process within the ammonium tartrate solution, an aluminum oxide film called a barrier layer is formed to a thickness of 120 nm. When the voltage of 10 volts is applied to the substrate within the oxalic acid, a current begins to flow after a predetermined time. As the current recovers, a plurality of recesses 7, the depth of each recess being approximately 1 to 2 nm, are formed within the barrier layer as shown in FIG. 6. Some of the recesses develop into pores 5', the diameter of each pore being approximately 10 nm in accordance with the voltage of 10 volts. Some of the pores 5' develop into pores 4. Further processing is the same as that of the first embodiment.

A porous film upon the aluminum substrate can be formed, even if the initial anodization within the ammonium tartrate solution is omitted. However, the pore diameter is larger than that obtained without omitting the initial anodization.

When anodizing an aluminum substrate within an oxalic acid solution, the pore development speed within the barrier layer is greater than the speed of developing pores directly upon the aluminum substrate by means of the branching method, because the latter case requires a long period of time to recover the current. Therefore, the total time for forming a porous film upon the substrate is shorter when the process forms the barrier layer than when the process does not form the barrier layer.

Figure 7:
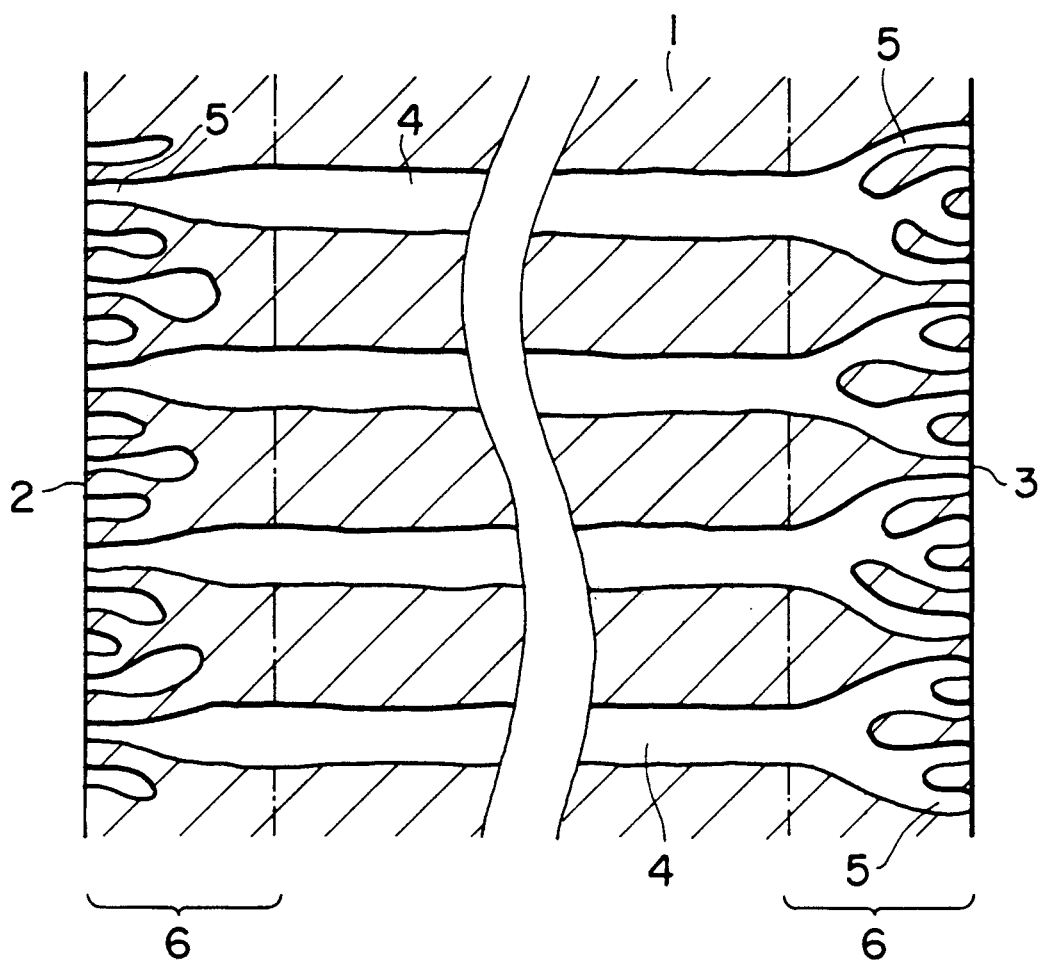
FIG. 7 is an enlarged sectional view of a film constructed according to a third embodiment of the present invention.
Figure 8:
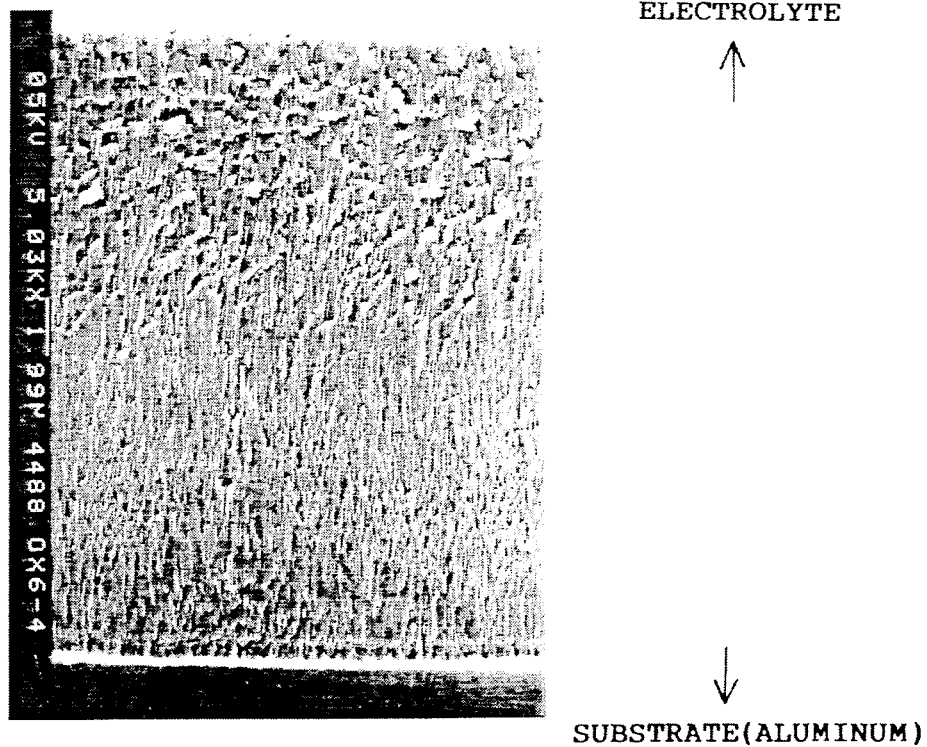
FIG. 8 is a scanning electron microscopic photograph of a section of the film of FIG. 7.

FIG. 7 shows a film formed in accordance with the combination of (4) in Table 1. Although the diameter of each pore 5 is larger than that of the pores 5 of FIGS. 2 and 6, the smaller diameter pores are more symmetrically disposed than those of the previous embodiments. Consequently, the film deforms very little upon heat treatment thereof, and has greater dynamic strength than that of the film obtained by means of the other embodiments of the present invention.

The heat-treated film according to the present invention can be used for various purposes, such as for example:

the removal of noxious gases and particles within exhaust gases emitted from factories, plants and thermal power plants, and motor vehicles;

the removal of impurities within vapors, and radio active gases such as, for example, krypton and xenon within exhaust gases of atomic reactors;

the purification of fuels within fuel cells;

the separation of micro-organisms within liquids such as, for example, virus, protein viruses and bacteria, and organic compounds such as, for example, hormones and bacteria;

the desalting of seawater;

the condensation of alcohol; and dialysis.

Since the pores are symmetrically disposed with respect to the thickness of the film, enzymes, catalysts and the like can be reliably retained within the pores. Consequently, the film can be used as a reactor bed for biochemical reactions and chemical reactions. Since the film is transparent, it can be used as an image display panel by filling the pores with a suitable material such that it emits light or color changes when electrical current passes there through.

From the foregoing, it will be understood that the present invention provides a porous aluminum oxide film which is not deformed upon heat treatment thereof because the smaller pores are symmetrically disposed with respect to the thickness of the film.

While the invention has been described in conjunction with preferred specific embodiments thereof, it will be understood that this description is intended to illustrate and not limit the scope of the invention, which is defined by the following claims.

What is claimed is:

1. A porous aluminum oxide film having a plurality of pores passing through the film, characterized in that:
    each pore has a pair of smaller diameter pores and a larger diameter pore,
    the larger diameter pore is disposed in a central portion with respect to the thickness of the film,
    the smaller diameter pores are extended from both faces of the film to the larger diameter pore to communicate with the larger diameter pore.

2. A film as set forth in claim 1, wherein:
   said larger diameter pore is interposed between said smaller diameter pores such that said smaller diameter pores, together with said larger diameter pore, form a linear array across said thickness of said film.

3. A film as set forth in claim 2, wherein:
   said plurality of pores, each comprising said larger diameter pore and said smaller diameter pores, are disposed parallel to each other so as to form a parallel array of said plurality of pores in a direction transverse to said thickness of said film.

4. A film as set forth in claim 1, wherein:
   said smaller diameter pores are disposed upon opposite sides of said larger diameter pore such that said smaller diameter pores, taken together with said larger diameter pore, form a linear array across said thickness of said film.

5. A film as set forth in claim 4, wherein:
   said plurality of pores, each comprising said larger diameter pore and said smaller diameter pores, are disposed parallel to each other so as to form a parallel array of said plurality of pores in a direction transverse to said thickness of said film.

6. A film as set forth in claim 1, wherein:
   each of said smaller diameter pores comprises a plurality of fine branches, at least one of said fine branches being in communication with said larger diameter pore.

7. A porous aluminum oxide film having a plurality of pores extending through said film, wherein:

each pore comprises a pair of smaller diameter pores, and a larger diameter pore;

said larger diameter pore is disposed within a central portion of said film with respect to the thickness of said film; and said smaller diameter pores extend from both surfaces of said film toward said larger diameter pore such that one end of each of said smaller diameter pores communicates with one end of said larger diameter pore, said larger diameter pore and said smaller diameter pores forming a symmetrical array across said thickness of said film.

8. A film as set forth in claim 7, wherein:

said larger diameter pore is interposed between said smaller diameter pores such that said smaller diameter pores, together with said larger diameter pore, form a linear array across said thickness of said film.

9. A film as set forth in claim 8, wherein:

said plurality of pores, each comprising said larger diameter pore and said smaller diameter pores, are disposed parallel to each other so as to form a parallel array of said plurality of pores in a direction transverse to said thickness of said film.

10. A film as set forth in claim 7, wherein:

said smaller diameter pores are disposed upon opposite sides of said larger diameter pore such that said smaller diameter pores, taken together with said larger diameter pore, form a linear array across said thickness of said film.

11. A film as set forth in claim 10, wherein:

said plurality of pores, each comprising said larger diameter pore and said smaller diameter pores, are disposed parallel to each other so as to form a parallel array of said plurality of pores in a direction transverse to said thickness of said film.

12. A film as set forth in claim 7, wherein:

each of said smaller diameter pores comprises a plurality of fine branches, at least one of said fine branches being in communication with said larger diameter pore.

13. A film as set forth in claim 1, wherein:

each of said smaller diameter pores has one end thereof opening onto one of said surfaces of said film, and another end thereof in communication with said larger diameter pore.

14. A film as set forth in claim 7, wherein:

each of said smaller diameter pores has another end thereof opening onto one of said surfaces of said film.

* * * * *